US011192350B2

(12) United States Patent
Pailler et al.

(10) Patent No.: US 11,192,350 B2
(45) Date of Patent: Dec. 7, 2021

(54) DECORATIVE MULTI-LAYER SURFACE COVERING COMPRISING POLYLACTIC ACID

(71) Applicant: TARKETT GDL, Lentzweiller (LU)

(72) Inventors: Frederic Pailler, Wiltz (LU); Pierre Bastin, Wiltz (LU); Andre Zeler, Wiltz (LU)

(73) Assignee: TARKETT GDL, Lentzweiller (LU)

( * ) Notice: Subject to any disclaimer, the term of this patent is extended or adjusted under 35 U.S.C. 154(b) by 61 days.

(21) Appl. No.: 15/768,662

(22) PCT Filed: Oct. 12, 2016

(86) PCT No.: PCT/EP2016/074436
§ 371 (c)(1),
(2) Date: Apr. 16, 2018

(87) PCT Pub. No.: WO2017/064108
PCT Pub. Date: Apr. 20, 2017

(65) Prior Publication Data
US 2018/0297342 A1    Oct. 18, 2018

(30) Foreign Application Priority Data

Oct. 16, 2015  (EP) ..................................... 15190125

(51) Int. Cl.
| B32B 3/10 | (2006.01) |
| B32B 27/36 | (2006.01) |
| B32B 27/16 | (2006.01) |
| B32B 27/22 | (2006.01) |
| B32B 27/30 | (2006.01) |
| B32B 3/30 | (2006.01) |
| C08L 67/04 | (2006.01) |
| B32B 27/18 | (2006.01) |
| C08L 33/06 | (2006.01) |

(52) U.S. Cl.
CPC .............. *B32B 27/36* (2013.01); *B32B 3/30* (2013.01); *B32B 27/16* (2013.01); *B32B 27/18* (2013.01); *B32B 27/22* (2013.01); *B32B 27/306* (2013.01); *B32B 27/308* (2013.01); *C08L 67/04* (2013.01); *B32B 2250/24* (2013.01); *B32B 2255/10* (2013.01); *B32B 2255/26* (2013.01); *B32B 2270/00* (2013.01); *B32B 2307/7163* (2013.01); *B32B 2419/00* (2013.01); *B32B 2419/04* (2013.01); *B32B 2451/00* (2013.01); *B32B 2471/00* (2013.01); *C08L 33/06* (2013.01)

(58) Field of Classification Search
None
See application file for complete search history.

(56) References Cited

U.S. PATENT DOCUMENTS

| 4,379,190 | A | 4/1983 | Schenck |
| 4,403,007 | A | 9/1983 | Coughlin |
| 4,438,228 | A | 3/1984 | Schenck |
| 5,409,986 | A | 4/1995 | Boudry et al. |
| 6,187,424 | B1 | 2/2001 | Kjellqvist et al. |
| 6,214,924 | B1 | 4/2001 | Bieser et al. |
| 7,741,408 | B2 | 6/2010 | Walther et al. |
| 2005/0136259 | A1* | 6/2005 | Mohanty ................. B29C 67/24 428/409 |
| 2010/0015420 | A1 | 1/2010 | Riebel et al. |
| 2011/0147120 | A1* | 6/2011 | Smith ....................... B32B 5/18 181/294 |
| 2011/0305886 | A1 | 12/2011 | Phan et al. |
| 2012/0328808 | A1* | 12/2012 | Mehlmann .............. B32B 27/06 428/35.7 |
| 2013/0004751 | A1 | 1/2013 | Huang et al. |

FOREIGN PATENT DOCUMENTS

| CN | 104193879 A | 12/2014 |
| EP | 0257796 | 3/1988 |
| EP | 0742098 A1 | 11/1996 |
| EP | 0850272 B1 | 4/1999 |
| EP | 1361039 A1 | 11/2003 |
| JP | S6092342 A | 5/1985 |
| JP | H06128402 A | 5/1994 |
| JP | H07125145 A | 5/1995 |
| JP | H0932258 A | 2/1997 |
| JP | H09302903 A | 11/1997 |
| JP | H1148416 A | 2/1999 |
| JP | 2000045187 A | 2/2000 |
| JP | 2000063732 A | 2/2000 |
| JP | 2002276141 A | 9/2002 |
| JP | 2004168860 A | 6/2004 |
| KR | 20140079575 A | 6/2014 |
| WO | 9204412 | 3/1992 |
| WO | 2007089451 A2 | 8/2007 |
| WO | 2009045564 A1 | 4/2009 |

OTHER PUBLICATIONS

ASTM "Standard Test Method for Measuring Adhesion by Tape Test"; D3359-09E2.
ASTM "Standard Test Method for Transition Temperatures and Enthalpies of Fusion and Crystallization of Polymers by Differential Scanning Calorimetry"; D3418-15.
ASTM "Standard Test Method for Wetting Tension of Polyethylene and Polypropylene Films"; D2578-17.

(Continued)

*Primary Examiner* — Christopher M Polley

(74) *Attorney, Agent, or Firm* — Cantor Colburn LLP

(57) ABSTRACT

The present invention is related to decorative multi-layer surface coverings comprising a wear layer, wherein said wear layer comprises a polymer blend, said polymer blend comprising polylactic acid and one/or more (meth)acrylate comprising polymer(s).

20 Claims, No Drawings

OTHER PUBLICATIONS

Cedric et al "Stereocomplexation of Polylactide Enhanced by Poly(methyl methacrylate): Improved Precessability and Thermomechanical Properties of Stereocomplexable Polylactide-Based Material"; ACS Applied Materials and Interfaces; 2013; vol. 5, No. 22; pp. 11797-11807.

International Search Report; International Application No. PCT/EP2016/074436; International Filing Date Oct. 12, 2016; dated Dec. 16, 2016; 5 pages.

ISO "Paints and varnishes—cross-cut test"; 2409:2013.

ISO "Resilient floor coverings—Determination of peel resistance"; 24345:2012.

Ren "Synthesis and characterization of melt-strength enhancer for polylactic acid"; XP-002754451; C:EPODATA/SEA/eplogf/external.log.

Written Opinion of the International Searching Authority; International Application No. PCT/EP2016/074436; International Filing Date Oct. 12, 2016; dated Dec. 16, 2016; 6 pages.

* cited by examiner

DECORATIVE MULTI-LAYER SURFACE COVERING COMPRISING POLYLACTIC ACID

FIELD OF THE INVENTION

The present invention is related to decorative multi-layer surface coverings comprising a wear layer, said wear layer comprising polylactic acid and (meth)acrylate comprising polymer(s).

The invention is further related to a method for the production of said surface coverings.

STATE OF THE ART

Synthetic flooring has gained widespread commercial acceptance and is made from various flooring compositions which may comprise all sorts of resins or mixtures of resins.

Flooring materials have to fulfil several technical criteria such as, for example, abrasion and scuff resistance, stain resistance, a good balance between hardness and flexibility, compatibility with additional adjuvants such as, for example, plasticizers, fillers, UV-stabilizers, pigments and colouring agents, flame retardants and antistatic agents, the possibility of its easily industrially processing, and an economically attractive raw materials cost.

While floorings such as tiles are frequently made as a mono-layer, multi-layer executions compositions exhibiting different in-use properties, can also be used.

A typical multi-layer flooring can contain, for example, seen from the bottom to the top, a core layer, a coloured and/or printed interface layer, a transparent wear layer and possibly an extra top-wear layer of polyurethane or poly (meth)acrylates. This flooring can optionally be combined with a form stabilizing element such as, for example a glass fiber mat and a backing layer.

A major component of many current synthetic flooring compositions is polyvinyl chloride (PVC) which can be applied in various forms such as, e.g. plasticized PVC and PVC foam. As a matter of fact, PVC is virtually the sole polymer which is widely used in flooring materials.

For environmental and other reasons, there is an on-going effort to develop adequate resin compositions for flooring with a substantially reduced chlorine content.

The ecological concerns related to the PVC decorative covering segment pertain to recyclability or energy recovery, volatile organic content levels, and the use of heavy metal stabilizers.

The hydrogen chloride and heavy metal ash from decomposition of the heavy metal stabilizers are undesired consequences from the incineration of scrap associated with manufacturing and installation of PVC-based covering materials.

Consequently, even though PVC offers an excellent mechanical, acoustic and heat insulation compromise in its application to floor coverings, the manufacturers of these coverings have been looking for a substitute for it, providing an answer to the following three points of concern:
- releasing no toxic gas when burnt, such as chlorine, hydrochloric acid, sulfur dioxide or nitrogen oxides;
- having properties, especially mechanical properties and fire resistance, of the same order as those obtained today with PVC;
- being capable of processing or fabrication on existing equipment, especially by extrusion, calendering, and the like.

In recent years, PVC-free floor and wall coverings materials have become popular and already have been subject of a considerable number of patents such as for example EP 0257796 (B1), EP 0742098 (B1), EP 0850272 (B1), EP1611201 (B1), U.S. Pat. Nos. 4,379,190, 4,403,007, 4,438,228, 5,409,986, 6,214,924, 6,187,424, US 2011/0305886, JP 2004168860, JP 2002276141, JPH 07125145, JPH 06128402, JP 2000063732, JPH 1148416, JP 2000045187, JPH 0932258, JPS 6092342 and JPH 09302903.

In light of the growing environmental awareness, it is advantageous to replace petrochemical plastics to a maximum and to have ecologically friendly "green" materials, such as polylactic acid (PLA) as raw material(s) for flooring applications providing the flooring with desirable physical and mechanical properties.

PLA (polylactic acid) has been one of the most commercially successful bioplastics and its introduction into floor and wall coverings already is subject to a number of patents.

US 2005/0136259 relates to polylactide-based products and more particularly to durable tile or sheet form floor coverings made of one or more layers of polymers suitable for e.g. pedestrian traffic in domestic and/or other situations over an extended period of time.

US 2010/0015420 relates to a biolaminate composite assembly, including one or more biolaminate layers, a non-plastic rigid substrate and an adhesive layer in contact with the substrate and the one or more biolaminate layers. Biolaminate refers to one or more thin layers including materials that are derived from natural or biological components such as polylactic acid in combination with optional additives, colorants, fillers, reinforcements, minerals, and other inputs.

US 2013/004751 discloses a flooring material using polylactic acid resin comprising a base layer, a print layer which is formed on top of the base layer, and has a print pattern on an upper side thereof and a transparent layer which is formed on top of the print layer, wherein one or more of the base layer, the print layer, and the transparent layer include polylactic acid resin.

EP 1361039 B1 discloses polymeric materials and products prepared from the polymeric materials including a polylactic acid-based polymer in combination with plasticizer and a compatibilizer, and optionally include a filler. The polymeric material can include between about 30 to about 50 percent by weight polyvinyl chloride, polyethylene glycol, polyglycolide, ethylene vinyl acetate, polycarbonate, polycaprolactone, polyhydroxyalkanoates and polyolefins modified with polar groups such as an ionomer. The plasticizer is typically an epoxidized vegetable oil or esterified and epoxidized vegetable oil and is typically present in an amount of between about 10 and about 50% by weight. The compatibilizer comprising a polyolefin modified with one or more polar functional groups, is typically present in an amount of between about 5 and about 10% by weight. The material can be used in decorative surface coverings, such as a floor coverings, particularly when it is in the form of a polymeric sheet.

WO 2007/089451 and WO 2009/045564 relate to a blend of one or more biodegradable polymers with one or more acrylic copolymers, in an amount of from 0.1 to 15% by weight, for the purpose of improving good metal release properties as well as other improved properties, such as melt strength, of said one or more biodegradable polymer(s). One problem, for instance with polylactide is its poor melt strength leading to difficulties in subsequent melt processing.

WO 92/04412 relates to films of blends of polyhydroxy acid polymer, such as polylactic acid, and other compatible thermoplastic polymers characterized as having a sufficient number and distribution of hydrophilic groups, such as copolyetheresters, ethylene vinyl alcohol comprising copolymers and polyolefins, and their production by melt processing.

Substituting PVC by "green" alternatives in general necessitates to accept compromises regarding to the technical performances of the derived decorative surface coverings.

The use of polylactid acid as a polyvinyl chloride alternative results in a too low melt-viscosity so that calendering problems under conventional processing conditions using conventional equipment are observed.

AIMS OF THE INVENTION

The present invention aims to provide a decorative floor and wall coverings, comprising polylactic acid, that does not present the drawbacks of the state of the art decorative surface coverings comprising green polymers.

The present invention aims to provide a multi-layer decorative surface covering comprising a wear layer prepared from a polymer blend comprising polylactic acid, wherein at least one of the layers, different from the wear layer and constituting the decorative surface covering, comprises biobased polymers and/or polymers derived from petrochemicals.

Moreover, the present invention aims providing a multi-layer decorative surface covering comprising a wear layer comprising biobased plasticizers.

The present invention further aims to provide said multi-layer decorative surface coverings using conventional processing equipment and processing conditions, wherein said decorative surface coverings are characterized by an adhesion between the wear layer and the underlying layer (printed layer), and an adhesion between the top-coat and the wear layer which is comparable to what has been realized in existing PVC-based decorative surface coverings.

SUMMARY OF THE INVENTION

The present invention discloses a decorative multi-layer surface covering comprising a wear layer, said wear layer comprising a polymer blend, said polymer blend comprising:
  from 20 to 80% by weight, preferably from 25 to 75% by weight, more preferably from 30 to 70% by weight of polylactic acid (i);
  from 80 to 20% by weight, preferably from 75 to 25% by weight, more preferably from 70 to 30% by weight of one or more (meth)acrylate comprising polymer(s) (ii) or of a mixture of one or more (meth)acrylate comprising polymer(s) and one or more vinyl alkanoate comprising polymer(s) (iii);
the total amount of polymer in the polymer blend representing 100% by weight.
  Preferred embodiments of the present invention disclose one or more of the following features:
    the one or more alkyl (meth)acrylate comprising polymer(s) (ii) are selected from the group of:
      (ii.a) the (meth)acrylate homo- or a random (co)polymer comprising at least 60% by weight, preferably at least 70% by weight, more preferably at least 80 parts by weight of methyl (meth)acrylate;
      (ii.b) the (meth)acrylate copolymer is a block copolymer comprising one or more blocks of methacrylic ester units and one or more blocks of acrylic ester units;
      (ii.c) the alkene/(meth)acrylate copolymer comprising from 50 to 95% by weight of one or more alkenes and from 5 to 50% by weight of one or more $C_1$-$C_8$ alkyl (meth)acrylates;
      (ii.d) the alkene/alkyl(meth)acrylate/carbon monoxide copolymers comprising from 40 to 80% by weight of one or more alkenes and from 5 to 60% by weight of one or more $C_1$-$C_8$ alkyl (meth)acrylates and 3 to 30% by weight of carbon monoxide; and
      mixtures of (ii.a), (ii.b), (ii.c) and (ii.d).
  the one or more vinyl alkanoate comprising polymers (ii) are selected from the group consisting of:
    (iii.a) the vinyl alkanoate homo- or copolymers comprising 60% by weight or more, preferably 70% or more, more preferably 80% or more, most preferably 90% or more of vinyl acetate;
    (iii.b) the alkene/vinyl alkanoate copolymers comprising 60% by weight or more, preferably 70% or more, more preferably 80% or more, most preferably 85% or more of vinyl alkanoate;
    (iii.c) the alkene/vinyl alkanoate/carbon monoxide copolymer comprising 40 to 80% by weight of one or more alkenes, 5 to 60% by weight of one or more vinyl alkanoates and 3 to 30% by weight of carbon monoxide; and
    mixtures of (iii.a), (iii.b) and (iii.c).
  the wear layer comprises from 2 to 100 parts by weight, preferably from 3 to 70 parts by weight, more preferably from 4 to 55 parts by weight and most preferably from 5 to 40 part by weight of one or more plasticizers selected from the group consisting of dialkyl esters of cyclohexane dicarboxylic acids; dialkyl esters of aliphatic dicarboxylic acids; alkyl esters of aromatic mono- di-, tri-, or tetra-carboxylic acids; lower alkyl phosphates; lower alkyl-aryl phosphates; alkyl sulfonates and bioplasticizers for 100 parts by weight of polymer blend.
  the wear layer comprises one or more bioplasticizers selected from the group consisting of acetylated monoglycerides, $C_1$-$C_8$ alkyl citrate, $C_1$-$C_8$ alkyl acetylcitrate and epoxidized vegetable oils.
  the wear later comprises from 0.01 to 3 parts by weight, preferably from 0.1 to 20 parts by weight of an antioxidant, said antioxidant being a hindered phenol type antioxidant alone or a mixture of a hindered phenol type antioxidant and a phosphite type antioxidant, for 100 parts by weight of the polymer blend.
  wear layer is polyvinyl chloride free.
  the decorative multi-layer surface covering comprises:
    a printed layer in contact with the bottom surface of the wear layer,
    a core layer in contact with the bottom surface of the printed layer,
    a backing layer in contact with the bottom surface of the core layer,
  wherein at least one of said backing-, core- and printed layer comprises polylactic acid and/or one or more (meth)acrylate comprising polymer and/or one or more vinyl alkanoate comprising polymer.
  at least one of the backing layer, the printed layer and the core layer is polyvinyl chloride free.

the decorative multi-layer surface coverings comprises a cross-linked top-layer on the top-surface of the wear layer, said top-layer comprising polyurethane chains.

the cross-linked top-layer comprises one or more types of micro-scale particle(s) and/or one or more types of nano-scale particle(s).

the decorative multi-layer surface covering comprises an embossed structure.

The present invention further discloses a method for the preparation of the decorative multi-layer surface coverings comprising the steps of:

a) melt-mixing the wear layer constituents at a temperature comprised between 140 and 240° C. to form a wear-paste;

b) converting the wear-paste of step a) into the wear-layer using a calendering process at a temperature comprised between 100 and 200° C.;

c) contacting and affixing the bottom-surface of the wear layer of step b) with one or more layers wherein at least one of said layers comprise polylactic acid and/or acrylate polymer, said contacting and affixing being performed through a calendering process, at a temperature comprised between 100 and 220° C., to form a decorative multi-layer stack.

Preferred embodiments of the method for the preparation of said multi-layer decorative surface covering disclose one or more of the following features:

the method comprises the additional step of subjecting the top-surface of the wear layer to a plasma treatment, preferably a corona plasma treatment adjusted to provide a surface energy of at least 38 mN/m, preferably of at least 40 mN/m, more of at least 42 mN/m, according to ASTM D2578.

the method comprises the additional step of contacting the top surface of the wear layer with a top-layer, said top-layer being obtained from drying and/or cross-linking a polyurethane coating formulation, preferably from cross-linking, as a result of actinic irradiation, a radiation curable coating composition, said radiation curable composition comprising an ethylenically unsaturated polyurethane and one or more ethylenically unsaturated ester, ether or urethane comprising oligomers and/or monomers.

the method comprises the additional step of mechanical embossing the decorative multilayer stack of step c) before application of the radiation curable composition, or before cross-linking of the radiation curable composition.

DETAILED DESCRIPTION OF THE INVENTION

The present invention provides a decorative multi-layer surface covering comprising a backing layer, a core layer formed on top of the backing layer, a print layer formed on top of the core layer, said printed layer optionally having a printed pattern on its top-surface and/or its bottom surface; and a transparent wear layer formed on top of the printed layer, wherein the wear layer comprises a polymer blend comprising PLA and one or more (meth)acrylate comprising polymer(s) or PLA and one or more (meth)acrylate comprising polymer(s) and one or more vinyl alkanoate comprising polymers and is preferably plasticized.

The inventors have found that combining (meth)acrylate comprising polymer(s) and optionally vinyl alkanoate comprising polymer(s) with PLA, enables calendaring at standard PVC-conditions without introducing inconvenient properties.

The flooring material may further include a surface treatment layer formed on top of the transparent wear layer.

The decorative multi-layer surface covering of the present invention further is characterized in that at least one of the layers, different from the wear layer and constituting said multi-layer surface covering comprises PLA and/or one or more acrylate polymers.

Preferably the wear layer is polyvinyl chloride free.

Preferably at least one of the backing layer, the core layer and the printing layer is polyvinyl chloride free; more preferably the decorative multi-layer surface covering is polyvinyl chloride free.

Polylactic acid (i) (PLA) for being used in the composition of the present invention, refers to a thermoplastic polyester derived from 2-hydroxy lactate (lactic acid) or lactide (cyclic diester). The formula of the subunit is:
—[O—CH(CH$_3$)—CO]—

The alpha-carbon of the monomer (CH$_3$CH(OH)CO$_2$H) is optically active, said monomer being produced by a fermentation method using a sugar extracted from maize, potatoes, or the like. Polylactic acid is typically selected from the group consisting of D-polylactic acid, L-polylactic acid, D,L-polylactic acid, meso-polylactic acid, and any combination thereof.

PLA in general is classified into crystalline PLA and amorphous PLA. The amorphous character increases as the racemic content increases.

A typical PLA (i), for being used in the polymer blend of the present invention, is an amorphous resin, possibly comprising some crystallinity, and characterized by a number average molecular weight comprised between 15,000 and 300,000, preferably between 50,000 and 250,000.

(Meth)acrylate comprising polymers (ii) for being used in the polymer blend of the wear layer of the present invention are selected from the group consisting of alkyl(meth)acrylate homo- and random copolymers (ii.a); alkyl(meth)acrylate block copolymers (ii.b); alkene/alkyl(meth)acrylate copolymers (ii.c); alkene/alkyl(meth)acrylate/carbon monoxide copolymers (ii.d) and mixtures thereof.

The alkyl(meth)acrylate (co)polymers (ii.a) comprise homopolymers of methyl methacrylate and/or random copolymers of methyl methacrylate and C$_1$ to C$_8$ alkyl (meth) acrylate, said C$_1$ to C$_8$ alkyl (meth)acrylates being selected from the group consisting of methyl (meth)acrylate, ethyl (meth)acrylate, n-propyl (meth)acrylate, n-butyl (meth) acrylate, i-butyl (meth)acrylate, n-hexyl (meth)acrylate, and 2-ethylhexyl (meth)acrylate; said copolymers containing at least 60% by weight, preferably at least 70% by weight, more preferably at least 80 parts by weight of methyl methacrylate.

Poly(methyl methacrylate) (PMMA) is preferably used.

The alkyl (meth)acrylate block copolymers (ii.b) comprise from 10 to 90% by weight, preferably from 20 to 80% by weight of one or more block(s) comprising alkyl methacrylate monomers and from 90 to 10% by weight, preferably from 80 to 20% by weight of one or more blocks comprising alkyl acrylate monomers.

Preferably the glass transition temperature (measured by Differential Scanning calorimetry, according to ASTM D3418 with a heating gradient of 20° C. per minute) of the alkyl methacrylate comprising blocks is comprised between 70 and 110° C., more preferably between 80 and 110° C. and most preferably between 90 and 110° C. The glass transition temperature of the alkyl acrylate comprising blocks is comprised between −70 and −20° C., preferably between −60 and −30° C. and more preferably between −50 and −40° C.

Preferably the alkyl (meth)acrylate block copolymer is a di-block copolymer comprising a block comprising alkyl acrylate monomers and a block comprising alkyl methacrylate monomers such as for example a di-block copolymer comprising a block comprising n-butyl acrylate monomers and a block comprising methyl methacrylate monomers.

The alkyl (meth)acrylate copolymer more preferably is a tri-block copolymer comprising one block comprising alkyl acrylate monomers and two blocks comprising alkyl methacrylate monomers such as for example a tri-block copolymer comprising one block comprising n-butyl acrylate monomers and two blocks comprising methyl methacrylate monomers.

The alkene/alkyl(meth)acrylate copolymers (ii.c) comprise from 50 to 95% by weight of one alkenes and from 5 to 50% by weight of one or more $C_1$-$C_8$ alkyl (meth) acrylates wherein the one or more alkenes are defined by the general formula $R_1R_2C=CR_3R_4$, wherein $R_1$, $R_2$, $R_3$ and $R_4$ independently is a hydrogen or an alkyl radical containing from 1 to 4 carbon atoms and are preferably selected from the group consisting of ethene, propene, 1-butene, 1-pentene, 1-hexene, 2-methyl-1-butene, 2,3-dimethyl-1-pentene; and wherein the $C_1$-$C_8$ alkyl (meth)acrylates are selected from the group as defined in the alkyl(meth)acrylate (co) polymers (ii.a).

Preferably the alkene/alkyl(meth)acrylate copolymer is an ethylene/methylacrylate or an ethylene/butylacrylate copolymer.

The alkene/alkyl(meth)acrylate/carbon monoxide copolymers (ii.d) comprise from 40 to 80% by weight of one or more alkenes and from 5 to 60% by weight of one or more $C_1$-$C_8$ alkyl (meth)acrylates and from 3 to 30% by weight of carbon monoxide wherein the one or more alkenes and the one or more $C_1$-$C_8$ alkyl (meth)acrylates are selected from the group as defined in (ii.c).

Preferably the alkene/alkyl(meth)acrylate/carbon monoxide copolymer (ii.d) is an ethylene/ethyl acrylate/carbon monoxide, an ethylene/n-butyl acrylate/carbon monoxide or an ethylene/2-ethylhexyl acrylate/carbon monoxide copolymer.

The vinyl alkanoate comprising polymers (iii) for being used in the polymer blend of the wear layer of the present invention are selected from the group consisting of vinyl alkanoate homo- and copolymers (iii.a), alkene/vinyl alkanoate copolymers (iii.b), alkene/vinyl alkanoate/carbon monoxide copolymers (iii.c) and mixtures thereof.

The vinyl alkanoate comprising homo- and copolymers (iii.a) comprise one or more vinyl alkanoate monomer(s), defined by the general formula $RCOOCH=CH_2$, wherein R is an alkyl radical containing from 1 to 20 carbon atoms, and are preferably selected from the group consisting of vinyl formate, vinyl acetate, vinyl propionate, vinyl butyrate, vinyl octanoate and vinyl stearate.

Preferably the vinyl alkanoate comprising copolymers (iii.a) comprise at least 60% by weight, more preferably at least 70% by weight, most preferably at least 80% by weight or even at least 90% by weight of vinyl acetate. Preferably the vinyl alkanoate polymer is polyvinyl acetate.

The alkene/vinyl alkanoate copolymers (iii.b) comprise one or more alkenes and one or more vinyl alkanoate(s) wherein the one or more alkenes are defined as in (ii.c) and wherein the one or more vinyl alkanoate monomer(s) are defined as in the vinyl alkanoate homo- and copolymers (iii.a).

Preferably the alkene/vinyl alkanoate copolymer (iii.b) comprises at least 60% by weight, more preferably at least 70% by weight, most preferably at least 80% by weight or even at least 85% by weight of one or more vinyl alkanoate(s) and 40% or less, preferably 30% or less, more preferably 20% or less, most preferably 15% or less of one or more 1-alkene(s).

Preferably the alkene/vinyl alkanoate copolymer (iii.b) is an ethylene/vinyl acetate copolymer comprising at least 60% by weight, preferably at least 70% by weight, more preferably at least 80% by weight, most preferably at least 85% by weight of vinyl acetate.

The alkene/vinyl alkanoate/carbon monoxide copolymers (iii.c) comprise 40 to 80% by weight of one or more alkenes, 5 to 60% by weight of one or more vinyl alkanoates and 3 to 30% by weight of carbon monoxide, wherein the one or more alkenes and the one or more vinyl alkanoates are defined as in the alkene/vinyl alkanoate copolymers (iii.b).

Preferably the alkene/vinyl alkanoate/carbon monoxide copolymer (iii.c) is an ethylene/vinyl acetate/carbon monoxide copolymer.

The polymer blend of the wear layer of the decorative surface covering according to the present invention comprises:
from 20 to 80% by weight, preferably from 25 to 75% by weight, more preferably from 30 to 70% by weight of polylactic acid (i);
from 80 to 20% by weight, preferably from 75 to 25% by weight, more preferably from 70 to 30% by weight of one or more (meth)acrylate comprising polymer(s) (ii) or of a mixture of one or more (meth)acrylate comprising polymer(s) (ii) and one or more vinyl alkanoate comprising polymer(s) (iii).

The composition of the wear layer according to the present invention further comprises ingredients such as plasticizers, preferably bioplasticizers, and one or more additives, such as, modifying resins, thermal and light stabilizers, flame retardants, or any combination thereof.

Any plasticizer capable of plasticizing the composition comprising a PLA and one or more acrylate polymer(s) can be used. Suitable plasticizers are selected from the group consisting of dialkyl esters of cyclohexane dicarboxylic acids; dialkyl esters of aliphatic dicarboxylic acids; alkyl esters of aromatic mono- di-, tri-, or tetra-carboxylic acids; lower alkyl citrates; lower alkyl phosphates; lower alkyl-aryl phosphates; alkyl sulfonates and other plasticizers used in conventional polyvinyl chloride applications.

Preferably the plasticizers comprise alkyl esters of polycarboxylic acids, more preferably alkyl esters of aromatic polycarboxylic acids.

Preferably the plasticizers comprise an epoxidized or otherwise derivatized vegetable oils, for example epoxidized soybean oils such as epoxidized $C_1$-$C_{10}$ alkyl soyate, epoxidized linseed oil, epoxidized soy oil, epoxidized tall oil and the like.

Preferably the plasticizer is an ecologically friendly citrate-based plasticizer that includes a blend of citrate and derivatized vegetable oil.

Preferably the plasticizer is an acetylated monoglycerides such as for example the acetylated monoglyceride of ricinoleic acid.

The plasticizer is typically present in an amount of up to 100 parts by weight, preferably from 2 to 100 parts by weight, more preferably from 3 to 70 parts by weight, most preferably from 4 to 55 parts by weight or even from 5 to 40 parts by weight, for 100 parts by weight of polymer blend.

The compositions of the wear layer of the present invention further comprise one or more antioxidants in an amount comprised between 0.01 to 3 parts by weight, preferably from 0.1 to 2 parts by weight, for 100 parts by weight of the polymer blend.

The antioxidant for being used in the decorative surface coverings of the present invention comprises one or more sterically hindered phenols or a mixture of one or more sterically hindered phenols and one or more phosphites.

The sterically hindered phenols, preferably used in the decorative surface coverings of the present invention are octadecyl-3-(3,5-di-t-butyl-4-hydroxyphenyl)propionate (Irganox® 1076); pentaerythritoltetrakis[3-(3,5-di-t-butyl-4-hydroxyphenyl)propionate] (Irganox® 1010) both supplied from BASF; and 4,4'-methylene-bis(2,6-di-t-butylphenol).

The phosphites preferably used in the decorative surface coverings of the present invention are trisnonylphenyl phosphite (Weston® TNPP) supplied from Addivant™; tris (2,4-di-t-butylphenyl)phosphite (Irgafos® 168) supplied from BASF, Ltd. and bis(2,4-di-t-butylphenylpentaerythritol) diphosphate (Everfos®-626) supplied from Everspring Chemical Co., Ltd.

The wear layer of the decorative surface coverings of the present invention further may comprise one or more lubricants of the stearic acid type, the fatty acid ester type, the fatty acid amide type, the paraffin hydrocarbon type, the naphtenic hydrocarbon type, the metal soap type, the silicone type, polyethylene glycol type and waxes, used alone or as a mixture. Preferred lubricants comprise a mixture of stearic acid type and silicone type lubricants.

Preferred stearic acid type lubricants include stearic acid and zinc stearate.

Preferred silicone type lubricants include siloxane homopolymers or copolymers comprising dimethylsiloxane units, methylhydrogen siloxane units, diphenylsiloxane units, phenylmethylsiloxane units, dimethylhydrogen siloxane units and trimethylsiloxane units. A preferred silicone is polydimethylsiloxane.

The wear layer of the decorative surface coverings of the present invention may comprise lubricants in an amount up to 10 parts by weight, preferably in an amount comprised between 0.5 and 5 parts by weight, more preferably between 1.5 and 4.5 parts by weight, most preferably between 2 and 4 parts by weight for 100 parts of polymer blend.

Besides the wear layer, the decorative multi-layer surface coverings of the present invention comprise a backing layer, a core layer and a printed layer, each having a top surface and a bottom surface, wherein the top surface of the backing layer is affixed to the bottom surface of the core layer, wherein the top surface of the core layer is affixed to the bottom surface of the printed layer; wherein the top surface of the printed layer is affixed to the bottom layer of the wear layer and wherein the top surface of the wear layer is covered with a protecting top-coat.

Preferably at least one of the backing layer, the core layer and the printed layer comprises PLA.

The backing layer, the core layer and the printed layer further may comprise:
one or more (meth)acrylate comprising polymer(s) selected from the group consisting of (meth)acrylate homo- or a random (co)polymers; (meth)acrylate block copolymers; alkene/alkyl (meth)acrylate copolymers; alkene/alkyl(meth)acrylate/carbon monoxide copolymers;
one or more vinyl alkanoate comprising polymers selected from the group consisting of vinyl alkanoate homo- or copolymers; alkene/vinyl alkanoate copolymers; alkene/vinyl alkanoate/carbon monoxide copolymers;
one or more alkene homo- or copolymers;
one or more polar group comprising polyolefins;
one or more thermoplastic elastomers comprising sequences of one or more vinyl aromatic monomer(s) and sequences of one or more alkylene(s).

Preferably at least one of the backing layer, the core layer and the printed layer is polyvinyl chloride free.

The protecting top-coat formulations for being used on the top-surface of the wear layer can be selected from the standard polyurethane formulation conventionally used for coating polyvinyl chloride surface coverings.

Examples of said standard formulations are two-component solvent borne, waterborne or solvent-free polyurethane formulations, solvent borne air drying or moisture curable one component formulations and aqueous polyurethane dispersions, wherein drying and/or cross-linking is performed at room temperature or higher eventually in combination with forced air conditions.

The protecting top-coat preferably is obtained from cross-linking under influence of actinic irradiation, of a radiation curable composition comprising ethylenically unsaturated polyurethane polymers and/or one or more ethylenically unsaturated oligomers and/or monomers, said oligomers and monomers comprising ester, ether and/or urethane group(s).

The radiation curable composition preferably comprises a radiation curable aqueous polyurethane dispersion.

The top surface of the wear layer optionally is subjected to a plasma treatment, preferably a corona plasma treatment, adjusted to provide a surface energy of at least 38 mN/m, preferably of at least 40 mN/m, more of at least 42 mN/m, according to ASTM D2578.

Corona plasma treatment ideally is done on-line immediately before application of the polyurethane top-coat formulation.

The protecting top-coat preferably comprises wear resistant particles. The wear resistant particles preferably are transparent and are characterized by a Mohs' hardness of at least 4, preferably at least 6, more preferably at least 8 and most preferably at least 9.

Preferably, the transparent wear resistant particles are materials chosen from the group consisting of α-aluminum oxide, fused corundum, sintered corundum, fully annealed aluminum oxides, sol-gel corundum, aluminum silicates, glass spheres, silica sand and mixtures thereof. The individual grain size fractions can thereby also encompass different solid particles and can consist of mixtures of solid particles. Optionally the wear resistant particles are subjected to a chemical surface treatment. Particularly good results are obtained with α-aluminum oxide, fused corundum or fully annealed aluminum oxides.

The wear resistant particles are characterized by an average particle size d50 comprised between 0.2 and 100 µm, preferably between 0.5 and 30 µm, more preferably between 2 and 20 µm The protecting top-coat, contacting the top surface of the wear layer according to the present invention may comprise up to 25% by weight, preferably between 0.5 and 20% by weight of transparent wear resistant particles.

The present invention provides a method for the preparation of said decorative surface coverings.

In general the calendering process is used wherein a molten polymer blend is fed to a series of two or more heated rolls in such a way to produce a polymer layer of uniform thickness.

The hot polymer blend for the preparation of the wear layer is prepared by compounding PLA, one or more (meth)acrylate comprising polymer(s) and/or vinyl alkanoate comprising polymer(s), one or more plasticizer(s), preferably bioplasticizers, and one or more antioxidant(s), optionally along with one or more lubricants and additives, such as for example flame retardants and antistatic agents, in a suitable heated mixer, for example in a twin screw or a single screw extruder, a mixing bowl with heated jacket, a Banbury mixer, continuous mixer, a ribbon mixer or any combination thereof at an internal temperature comprised between 140 and 240° C., preferable between 160 and 220° C., more preferable between 170 and 210° C. to form a blend.

By internal temperature it is meant the real temperature of the PVC-free paste and not the set temperatures of the equipment for preparing and processing of said PVC-free paste.

The uniform hot mass then is discharged onto one or more processing machines, comprising a series of two or more heated rolls in order to produce a polymer layer of uniform thickness.

The set temperature of the calendering rolls is comprised between 100 and 200° C., preferably between 120 and 190° C., more preferably between 130 and 180° C.

The backing layer, core layer and printed layer are prepared from melt mixing and melt calendering the corresponding polymer blend, plasticizer(s) and optional pigments, fillers and additives.

The printed layer is provided with one or more prints. The one or more prints may be provided either on the top-surface or on the bottom surface of the polymer layer. Otherwise one or more prints may be provided on both surfaces of said layer.

Standard inks for PVC application such as solvent containing, water based or solventless inks comprising one or more polymer(s) and/or oligomers selected for instance from the group consisting of polyolefins, poly(meth)acrylics, polyesters, polyamides, polyvinyl chloride, latex, polycarbonates, polyurethanes, polyethers, alkyd resins and mixtures thereof and one or more dyes and/or pigments can be used.

The ink compositions are dryable and/or curable. By dryable ink composition, the present invention means air drying optionally accelerated by application of heat, such as convection heat and/or medium and/or short infra-red. By curable ink composition, the present invention means cross-linking under the influence of air, heat and/or actinic radiation.

The print may be a decorative design. The decorative design may be natural designs and patterns such as a wood pattern or stone pattern. The decorative design may also be a fantasy design or pattern or a photograph.

The print may be obtained from a conventional printing process, such as for example offset printing, flexography, rotogravure or a digital printing process, such as single-pass and multi-pass.

Printing is performed at a temperature comprised between 25 and 60° C., preferably between 30° C. and 50° C.

The backing layer, core layer, printed layer and the wear layer then are contacted and affixed in a subsequent calendering step.

Calendering is performed at:
a temperature comprised between 100 and 200° C., preferably between 120 and 190° C., more preferably between 130 and 180° C.;
a speed comprised between 2 and 100 m/min, preferably between 10 and 50 m/min, more preferably between 10 and 20 m/min.

The thickness of the wear layer is comprised between 100 to 1000 µm, preferably between 200 to 700 µm.

A protecting top coating is preferably applied on the top surface of the wear layer. The protective top-coating preferably is cross-linked, more preferably is cross-linked by actinic irradiation.

A radiation curable composition, preferably a radiation curable aqueous polyurethane dispersion is homogeneously applied on the top surface of the decorative substrate standing at a temperature comprised between 25 and 60° C., preferably between 30° C. and 50° C.

The radiation curable compositions may be applied by any suitable coating process known to those of ordinary skill in the art, for example by direct gravure coating, reverse gravure coating, offset gravure coating, smooth roll coating, curtain coating, spray coating and combinations thereof. Direct gravure coating and smooth roll coating are preferred.

After evaporation of water, in a convection oven at about 100° C., the decorative substrate comprising the polyurethane top-layer optionally is heated to a temperature comprised between 10 and 200° C., and subsequently is mechanically embossed before cross-linking.

For the particular case where the radiation curable composition is not water based, such as for example a 100% solids or a near 100% solids composition said composition preferable is applied to the decorative substrate and cross-linked after the embossing step.

Mechanical embossing is performed by pressing a texture into the decorative surface covering comprising the polyurethane layer atop. Embossing is carried out at a pressure comprised between 10 and 25 kg·cm$^{-2}$ and surface temperature comprised between 100° C. and 200° C., preferably between 130° C. and 200° C.

The apparatus for mechanically embossing a substrate in general includes a cooled embossing roller and a backup roller operatively positioned within the embossing roller such that a nip is formed between the backup roller and the embossing roller whereby the substrate may pass through the nip and engage the embossing roller for imparting a mechanically embossed pattern. The apparatus further includes a profilometer capable of quantifying the mechanically embossed pattern as the substrate is being embossed.

In general the texture obtained from mechanical embossing is characterized by a depth comprised between about 10 to 100 µm, a width comprised between about 125 to 400 µm, a wall angle (angle relative to surface) comprised between about 5 to 40 degrees and a frequency of about 4 to 20 features per cm.

The embossed decorative substrate, comprising the uncured polyurethane coating, subsequently is cooled down to a temperature comprised between 30 and 70° C., preferably between 30 and 60° C. and subjected to actinic radiation to form the decorative substrate covering.

Actinic radiation may be applied by exposure to actinic radiation such as ultraviolet (UV) radiation with a wavelength of for instance 250-600 nm obtained from for example medium and high-pressure mercury vapour lamps, lasers, pulsed lamps (flashlight), halogen lamps, excimer emitters, LED lamps.

On the other hand actinic irradiation comprises bombardment with high-energy electron beams (EB) at for instance 150-300 keV.

It has been observed that the bonding strength between the wear- and the printed layer is comparable to the bonding strength between the PVC-comprising layers of the current polyvinyl chloride comprising surface coverings.

It also has been observed that the bonding strength between the wear- and the cross-linked top layer is comparable to the bonding strength between a polyvinyl chloride comprising layer and a cross-linked polyurethane comprising layer.

Bonding between the layers of the present invention, is characterized by a peel strength, according to ISO 24345:12 (Resilient floor coverings—determination of peel resistance) in excess of 50N/5 cm.

Similar values of peel strength are measured between the printing- and the core layer.

Examples

The following illustrative examples are merely meant to exemplify the present invention and are not destined to limit or otherwise define the scope of the present invention.

Table 1 illustrates the composition and the adhesion performances of printed layers according to the invention (Examples 1 to 15) along with comparative examples 16 to PA-210 from Kaneka and 33.3% by weight of Elvaloy® 441 HP from Dupont (alkene/(meth)acrylate/carbon monoxide copolymer)

The vinyl alkanoate comprising polymer is Vinnex® 2510 from Wacker (vinyl alkanoate polymer comprising at least 60% by weight of vinyl acetate) for example 6, Vinnex® 2525 from Wacker (vinyl alkanoate polymer comprising at least 60% by weight of vinyl acetate) for example 7, Levapren® 900 from Lanxess (alkene/vinyl alkanoate copolymer comprising 90% by weight of vinyl acetate) for example 8 and a mixture comprising 25% by weight of Vinnex® 2525 from Wacker and 75% by weight of Elvaloy® 742 from Dupont (alkene/vinyl alkanoate/carbon monoxide copolymer) for example 10.

The plasticizers introduced in the polymer blends are Citrofol® AII from Jungbunzlauer ($C_1$-$C_8$ alkyl acetylcitrate) for examples 8 and 13, Citrofol® BII from Jungbunzlauer ($C_1$-$C_8$ alkyl acetylcitrate) for examples 10 and 15, Grinsted® Soft-N-Safe from Danisco (acetylated monoglycerides) for examples 2, 3, 16 and 18, Eastman™ TOTM plasticizer from Eastman (trialkyl ester of aromatic

TABEL 1

| | Examples | | | | | | | | | | | | | | | Comp. Examples | | | |
|---|---|---|---|---|---|---|---|---|---|---|---|---|---|---|---|---|---|---|---|
| Constituent | 1 | 2 | 3 | 4 | 5 | 6 | 7 | 8 | 9 | 10 | 11 | 12 | 13 | 14 | 15 | 16 | 17 | 18 | 19 |
| Polylactic acid | 30 | 20 | 80 | 75 | 70 | 50 | 30 | 50 | 25 | 30 | 60 | 30 | 25 | 20 | 20 | 85 | 90 | 15 | 10 |
| (Meth)acrylate | 70 | 80 | 20 | 25 | 30 | 30 | 40 | 25 | 75 | 30 | 40 | 70 | 75 | 80 | 80 | 15 | 10 | 85 | 90 |
| Vinyl alkanoate | | | | | | 20 | 30 | 25 | | 40 | | | | | | | | | |
| Plasticizer | 5 | 40 | 15 | 15 | 25 | 20 | 40 | 10 | 10 | 10 | 30 | 35 | 35 | 40 | 55 | 30 | 30 | 30 | 30 |
| Processing—Melt Strength | | | | | | | | | | | | | | | | | | | |
| Excellent | | | | | X | X | X | | | | X | X | X | | | | | | |
| Good | | | | X | | | | X | X | | | | | X | X | X | | | |
| Medium | X | X | X | | | | | | | | | | | | | | | | |
| Bad | | | | | | | | | | | | | | | | X | X | X | X |

In table 1 the sum of the thermoplastic polymers of the polymer blend equals 100 parts.

The amount of plasticizer is expressed in parts for 100 parts of polymer blend.

Examples 1 to 15 are according to the invention; examples 16 to 19 are comparative.

All examples and comparative examples comprise 0.3 parts of antioxidant for 100 parts of polymer blend. The antioxidant is Irganox 1010, Irganox 1076 or a 1/1 mixture of both.

All examples and comparative examples comprise 0.8 parts of a stearic type lubricant (Radiacid® 444 from Olean); Additionally example 1 comprises 1 part of a silicone type lubricant (Wacker® AK 100000 from Wacker Chemie).

Polylactic acid is Ingeo™ from NatureWorks (4043D or 4060D).

The (meth)acrylate comprising polymer ((meth)acrylate homo- or a random (co)polymer) is Kane ACE® PA-210 from Kaneka for examples 2, 5, 6, 8, 12, 16 and 18, Kane ACE® PA-211 and/or Kane ACE® PA-210 from Kaneka for examples 3, 4, 10, 13 and 14 and PA 910 from LG Chemicals for examples 7, 11, 15, 17 and 19.

In example 1 the (meth)acrylate comprising polymer is a mixture comprising 30% by weight of PA 910 from LG Chemicals and 70% by weight of Vamac® D from Dupont (alkene/(meth)acrylate copolymer).

In example 9 the (meth)acrylate comprising polymer is mixture comprising 66.6% by weight of Kane ACE® tricarboxylic acid) for examples 12 and 14, Disflamoll® DPO from Lanxess (lower alkyl-aryl phosphates) for example 5, Plastimoll® DOA from BASF dialkyl ester of aromatic dicarboxylic acid) for examples 6 and 9, Drapex® 3.2 from Galata Chemical (epoxidized vegetable oil) for examples 7 and 11 and Drapex® 6.8 from Galata Chemical (epoxidized vegetable oil) for examples 1, 4, 17 and 19.

From table 1 it appears that the polymer blend according to the present invention (examples 1 to 15), is characterized by a medium to excellent melt strength and allows for a smooth and hassle free processing on existing equipment according to conventional process conditions.

On the contrary, polymer blends not according to the present invention (examples 16 to 19) have no melt strength and do not allow the calendaring process.

A polymer layer of 0.5 mm thickness was prepared through melt-mixing in an extruder at a temperature of 170° C. and calendering in a roller mill at a temperature of 170° C.

A printed layer (of 0.25 mm) comprising a polymer blend comprising from 20% by weight of polylactic acid, 10% by weight of polyvinyl butyral, 35% by weight of (meth)acrylate comprising polymer and 35% by weight of vinyl alkanoate comprising polymer was bonded to the bottom surface of the wear layer in a hot/cold-pressing step at 160° C. at approximately 4 bar pressure, followed by cooling down to 25° C.

A peel strength, according to ISO 24345:12 above 50N/5 cm has been measured for examples 1 to 15, contrary to the comparative examples 16 to 19 where a peel strength lower than 50N/5 cm. was measured.

To the wear layer of examples 1 to 15 and comparative examples 16 to 19, a radiation curable aqueous polyurethane dispersion with a composition as in table 2, was applied by a smooth roll coating process under conditions to have a dry coating thickness comprised between 10 and 12 µm.

TABLE 2

| component | % by weight |
|---|---|
| UV-PUD | 75.2 |
| pH stabilizer | 0.2 |
| Rheology agent | 0.5 |
| Matting agent | 2.9 |
| Anti-foaming agent | 0.8 |
| Wetting agent | 1.3 |
| Photoinitiator | 1.9 |
| Reactive diluent | 6.0 |
| Abrasive grain | 6.5 |
| water | 4.7 |

In table 2: the ultra-violet curable polyurethane dispersion is Bayhydrol® UV 2720/1 XP from Bayer characterized by a solid content of 40%; the pH stabilizer is Advantex® amine from Eastman; the matting agent is a 55/45 mixture of Deuteron® MK from Deuteron and Acematt®TS 100 from Evonik; the anti-foaming agent is Neocryl® AP 2861 from DSM Coating Resins; the wetting agent is a 69/31 mixture of Disperbyk® 190 and Byk®-348 from Byk Chemie; the photoinitiator is Esacure® KIP 100 F from Lamberti; the reactive diluent is a 68/32 mixture of SR 259 (polyethylene glycol 200 diacrylate) and SR 238 (HexaneDiolDiAcrylate) from Arkema and the abrasive grain is Alodur® ZWSK F 320 from Imerys.

The radiation curable polyurethane dispersion is applied on the corona treated top surface of the wear layer standing at about 50° C.

After evaporation of the water, in a convection oven at about 100° C., the wear layer, comprising the uncured ethylenically unsaturated polyurethane resin, is mechanically embossed at a pressure of about 15 kg·cm$^{-2}$ while standing at a temperature of about 160° C. and subsequently subjected for 6 seconds to irradiation with ultraviolet light emitted by a 160 W/cm medium pressure mercury vapor UV-bulb (Fusion UV Systems Ltd) with a total UV dose of 1500 mJ/cm$^2$ while standing at a temperature of 40° C.

The adhesion of the polyurethane topcoat to the top surface of the wear layer was assessed by the cross-cut test according to ISO 2409-2013 09E2 "Standard Test Method for Measuring Adhesion by the Cross-Cut Test.".

The coating was cut through with a series of several cuts at right angles in a defined manner using a Multi-Cross Cutter comprising 6 edges with a cutting distance of 2 mm.

The squared pattern (lattice) that is obtained is evaluated visually by examining the way in which the coating has broken away from the base material (along the cutting edges and/or complete squares) and comparing with the aid of the evaluation table.

The adhesion of the polyurethane topcoat to the top surface of the wear layer was also assessed by the tape test according to ASTM D3359-09E2 "Standard Test Method for Measuring Adhesion by the Tape Test."

To the squared pattern of cuts, as performed according to ISO 2409-2013, a 25.4 mm wide Tesa Scotch 4124 pressure-sensitive tape was then firmly applied and rapidly removed.

The resulting squared pattern, after removal of the pressure-sensitive tape is evaluated visually by examining the way in which the coating has broken away from the base material (along the cutting edges and/or complete squares) and comparing with the aid of the evaluation table.

For both tests, ISO 2409-2013 and ASTM D335909E2, the below evaluation criteria apply:

grade 5: the edges of the cuts are completely smooth; none of the squares of the lattice is detached.

grade 4: small flakes of the coating are detached at intersections; less than 5% of the area is affected.

grade 3: small flakes of the coating are detached along edges and at intersections of cuts. The area affected is 5 to 15% of the lattice.

grade 2: The coating has flaked along the edges and on parts of the squares. The area affected is 15 to 35% of the lattice.

grade 1: The coating has flaked along the edges of cuts in large ribbons and whole squares have detached. The area affected is 35 to 65% of the lattice.

grade 0: Flaking and detachment worse than grade 1.

For the wear layer, according to the present invention (examples 1 to 15) a grade value between 4.5 and 5 was recorded for both the Cross-Cut and the Tape test.

For the wear layer of the comparative examples (examples 16 to 19) a grade value between 3 and 4 was recorded for both the Cross-Cut and the Tape test.

Cross-Cut and the Tape test were performed on 10 different samples.

The invention claimed is:

1. A decorative multi-layer surface covering comprising a wear layer said wear layer comprising a polymer blend, said polymer blend comprising:

from 20 to 80% by weight of polylactic acid (i);

from 80 to 20% by weight of one or more (meth)acrylate comprising polymer(s) (ii) or of a mixture of one or more (meth)acrylate comprising polymer(s) and one or more vinyl alkanoate comprising polymer(s) (iii);

the total amount of polymer in the polymer blend representing 100% by weight, wherein the wear layer comprises from 2 to 100 parts by weight of one or more plasticizers selected from the group consisting of dialkyl esters of cyclohexane dicarboxylic acids; dialkyl esters of aliphatic dicarboxylic acids; alkyl esters of aromatic mono- di-, tri-, or tetra-carboxylic acids; lower alkyl phosphates; lower alkyl-aryl phosphates; alkyl sulfonates and bioplasticizers for 100 parts by weight of polymer blend, wherein the bioplasticizers are selected from the group consisting of acetylated monoglycerides, $C_1$-$C_8$ alkyl citrate, $C_1$-$C_8$ alkyl acetylcitrate;

the decorative multi-layer surface covering further comprising:

a printed layer in contact with the bottom surface of the wear layer, a core layer in contact with the bottom surface of the printed layer, wherein at least one of said core and printed layer comprises at least one of polylactic acid, one or more (meth)acrylate comprising polymer(s) and one or more vinyl alkanoate comprising polymer(s).

2. The decorative surface coverings according to claim 1, wherein the polymer blend comprises one or more (meth)acrylate comprising polymer(s) (ii) and wherein the one or more alkyl (meth)acrylate comprising polymer(s) (ii) are selected from the group of:

(ii.c) the alkene/(meth)acrylate copolymer comprising from 50 to 95% by weight of one or more alkenes and from 5 to 50% by weight of one or more $C_1$-$C_8$ alkyl (meth)acrylates;

(ii.d) the alkene/alkyl(meth)acrylate/carbon monoxide copolymers comprising from 40 to 80% by weight of one or more alkenes and from 5 to 60% by weight of one or more $C_1$-$C_8$ alkyl (meth)acrylates and 3 to 30% by weight of carbon monoxide; and mixtures of (ii.a), (ii.b), (ii.c) and (ii.d), with (ii.a) the (meth)acrylate homo- or a random (co)polymer comprising at least 60% by weight of methyl (meth)acrylate and (ii.b) the (meth)acrylate copolymer is a block copolymer comprising one or more blocks of methacrylic ester units and one or more blocks of acrylic ester units.

3. A decorative multi-layer surface covering comprising a wear layer, said wear layer comprising a polymer blend, said polymer blend comprising:

from 20 to 80% by weight of polylactic acid (i);

from 80 to 20% by weight of one or more (meth)acrylate comprising polymer(s) (ii) or of a mixture of one or more (meth)acrylate comprising polymer(s) and one or more vinyl alkanoate comprising polymer(s) (iii);

wherein the wear layer comprises from 2 to 100 parts by weight of one or more plasticizers selected from the group consisting of dialkyl esters of cyclohexane dicarboxylic acids; dialkyl esters of aliphatic dicarboxylic acids; alkyl esters of aromatic mono- di-, tri-, or tetra-carboxylic acids; lower alkyl phosphates; lower alky-aryl phosphates; alkyl sulfonates and bioplasticizers for 100 parts by weight of polymer blend, the total amount of polymer in the polymer blend representing 100% by weight, wherein the bioplasticizers are selected from the group consisting of acetylated monoglycerides, $C_1$-$C_8$ alkyl citrate, $C_1$-$C_8$ aklyl acetylcitrate;

wherein the polymer blend comprises a mixture of one or more (meth)acrylate comprising polymer(s) and one or more vinyl alkanoate comprising polymer(s) (iii) and wherein the one or more vinyl alkanoate comprising polymers (ii) are selected from the group consisting of:
(iii.a) the vinyl alkanoate homo- or copolymers comprising 60% by weight or more of vinyl acetate;
(iii.b) the alkene/vinyl alkanoate copolymers comprising 60% by weight or more of vinyl alkanoate;
(iii.c) the alkene/vinyl alkanoate/carbon monoxide copolymer comprising 40 to 80% by weight of one or more alkenes, 5 to 60% by weight of one or more vinyl alkanoates and 3 to 30% by weight of carbon monoxide; and
mixtures of (iii.a), (iii.b) and (iii.c).

4. The decorative surface coverings according to claim 1 comprising from 0.01 to 3 parts by weight of an antioxidant, said antioxidant being a hindered phenol type antioxidant alone or a mixture of a hindered phenol type antioxidant and a phosphite type antioxidant, for 100 parts by weight of the polymer blend.

5. The decorative multi-layer surface coverings according to claim 1, wherein the wear layer is polyvinyl chloride free.

6. The decorative multi-layer surface covering according to claim 1, comprising
a backing layer in contact with the bottom surface of the core layer.

7. The decorative multi-layer surface coverings according to claim 6, wherein at least one of the backing layer, the printed layer and the core layer is polyvinyl chloride free.

8. The decorative multi-layer surface coverings according to claim 1, comprising a cross-linked top-layer on the top-surface of the wear layer, said top-layer comprising polyurethane chains.

9. The decorative multi-layer surface coverings according to claim 8, wherein the cross-linked top-layer comprises at least one of one or more types of micro-scale particle(s) and one or more types of nano-scale particle(s).

10. The decorative multi-layer surface covering according to claim 1, comprising an embossed structure.

11. The decorative multi-layer surface covering according to claim 1, wherein the polymer blend comprises from 25 to 75% by weight of polylactic acid.

12. The decorative multi-layer surface covering according to claim 1, wherein the polymer blend comprises from 75 to 25% by weight of one or more (meth)acrylate comprising polymer(s) (ii) or of a mixture of one or more (meth)acrylate comprising polymer(s) and one or more vinyl alkanoate comprising polymer(s) (iii).

13. The decorative multi-layer surface covering according to claim 1, wherein the polymer blend comprises from 70 to 30% by weight of one or more (meth)acrylate comprising polymer(s) (ii) or of a mixture of one or more (meth)acrylate comprising polymer(s) and one or more vinyl alkanoate comprising polymer(s) (iii).

14. A decorative multi-layer surface covering according to claim 1, wherein said polymer blend comprises:

from 30 to 70% by weight of the polylactic acid (i);

from 70 to 30% by weight of the one or more (meth)acrylate comprising polymer(s) (ii) or of the mixture of the one or more (meth)acrylate comprising polymer(s) and the one or more vinyl alkanoate comprising polymer(s) (iii);

the total amount of polymer in the polymer blend representing 100% by weight.

15. A decorative multi-layer surface covering comprising a transparent wear layer said transparent wear layer comprising a polymer blend, said polymer blend comprising:

from 20 to 80% by weight of polylactic acid (i);

from 80 to 20% by weight of one or more (meth)acrylate comprising polymer(s) (ii) or of a mixture of one or more (meth)acrylate comprising polymer(s) and one or more vinyl alkanoate comprising polymer(s) (iii);

the total amount of polymer in the polymer blend representing 100% by weight, the decorative multi-layer surface covering further comprising:

a printed layer in contact with the bottom surface of the wear layer, a core layer in contact with the bottom surface of the printed layer, a backing layer in contact with the bottom surface of the core layer, wherein at least one of said backing, core and printed layer comprises at least one of polylactic acid, one or more (meth)acrylate comprising polymers and one or more vinyl alkanoate comprising polymer(s).

16. A decorative multi-layer surface covering as claimed in claim 15, wherein the printed layer is a digitally printed decorative design print.

17. A method for the preparation of decorative multi-layer surface coverings comprising a wear layer, said wear layer comprising a polymer blend, said polymer blend comprising, as wear layer constituents:
   from 20 to 80% by weight of polylactic acid (i);
   from 80 to 20% by weight of one or more (meth)acrylate comprising polymer(s) (ii) or of a mixture of one or more (meth)acrylate comprising polymer(s) and one or more vinyl alkanoate comprising polymer(s) (iii); and
   the total amount of polymer in the polymer blend representing 100% by weight;
   wherein the wear later comprises from 2 to 100 parts by weight of one or more plasticizers selected from the group consisting of dialkyl esters of cyclohexane dicarboxylic acids; dialkyl esters of aliphatic dicarboxylic acids; alkyl esters of aromatic mono- di-, tri-, or tetra-carboxylic acids; lower alkyl phosphates; lower alkyl-aryl phosphates; alkyl sulfonates and bioplasticizers for 100 parts by weight of polymer blend,
   wherein the bioplasticizers are selected from the group consisting of acetylated monoglycerides, $C_1$-$C_8$ alkyl citrate, $C_1$-$C_8$ alkyl acetylcitrate;
   the decorative multi-layer surface covering further comprising:
   a printed layer in contact with the bottom surface of the wear layer,
   a core layer in contact with the bottom surface of the printed layer,
   wherein at least one of said core and printed layer comprises at least one of polylactic acid, one or more (meth)acrylate comprising polymer(s) and one or more vinyl alkanoate comprising polymer(s);
the method comprising the steps of:
   a) melt-mixing the wear layer constituents at a temperature comprised between 140 and 240° C. to form a wear-paste;
   b) converting the wear-paste of step a) into the wear-layer using a calendering process at a temperature comprised between 100 and 200° C.;
   c) contacting and affixing the bottom-surface of the wear layer of step b) with one or more layers wherein at least one of said layers comprise at least one of polylactic acid and acrylate polymer, said contacting and affixing being performed through a calendering process, at a temperature comprised between 100 and 220° C., to form a decorative multi-layer stack.

18. The method according to claim 17 comprising the additional step of subjecting the top-surface of the wear layer to a plasma treatment adjusted to provide a surface energy of at least 38 mN/m according to ASTM D2578.

19. The method according to claim 17, comprising the additional step of contacting the top surface of the wear layer with a top-layer, said top-layer being obtained from drying, cross-linking, or drying and cross-linking a polyurethane coating formulation, as a result of actinic irradiation, a radiation curable coating composition, said radiation curable composition comprising an ethylenically unsaturated polyurethane and one or more ethylenically unsaturated ester, ether or urethane comprising at least one of oligomers and monomers.

20. The method according to claim 17, comprising the additional step of mechanical embossing the decorative multilayer stack of step c)
   before application of the radiation curable composition, or
   before cross-linking of the radiation curable composition.

* * * * *